US00RE44161E

(19) United States
(12) Reissued Patent
Matlin et al.

(10) Patent Number: US RE44,161 E
(45) Date of Reissued Patent: Apr. 23, 2013

(54) SHREDDER WITH THICKNESS DETECTOR

(75) Inventors: Tai Hoon K. Matlin, Round Lake Beach, IL (US); Eric Gach, Mount Prospect, IL (US)

(73) Assignee: Fellowes, Inc., Itasca, IL (US)

(21) Appl. No.: 13/030,849

(22) Filed: Feb. 18, 2011

Related U.S. Patent Documents

Reissue of:
(64) Patent No.: 7,631,822
Issued: Dec. 15, 2009
Appl. No.: 11/444,491
Filed: Jun. 1, 2006

U.S. Applications:
(63) Continuation-in-part of application No. 11/177,480, filed on Jul. 11, 2005, now Pat. No. 7,661,614, and a continuation-in-part of application No. 11/385,864, filed on Mar. 22, 2006, now Pat. No. 7,798,435.

(51) Int. Cl.
*B02C 4/32* (2006.01)
*B02C 7/14* (2006.01)
*B02C 9/04* (2006.01)
*B02C 11/08* (2006.01)

(52) U.S. Cl.
USPC ..... 241/36; 241/100; 241/236

(58) Field of Classification Search ..... 241/36, 241/37.5, 100, 236
See application file for complete search history.

(56) References Cited

U.S. PATENT DOCUMENTS 2,221,516 A 4/1937 Hathaway
3,619,537 A * 11/1971 Hosokawa et al. ..... 219/723
3,724,166 A * 4/1973 van der Meer ..... 53/334
3,724,766 A 4/1973 Bosland
3,764,819 A * 10/1973 Muller ..... 307/116
3,785,230 A 1/1974 Lokey (Continued)

FOREIGN PATENT DOCUMENTS

DE 3313232 10/1984
DE 8619856.4 10/1988

(Continued)

OTHER PUBLICATIONS

English Translation of Japanese Patent Application Publication No. 9-38513, published on Feb. 10, 1997.

(Continued)

*Primary Examiner* — Bena Miller
(74) *Attorney, Agent, or Firm* — Pillsbury Winthrop Shaw Pittman LLP

(57) ABSTRACT

A shredder is disclosed. The shredder includes a housing having a throat for receiving at least one article to be shredded, and a shredder mechanism received in the housing and including an electrically powered motor and cutter elements. The shredder mechanism enables the at least one article to be shredded to be fed into the cutter elements. The motor is operable to drive the cutter elements so that the cutter elements shred the articles fed therein. The shredder also includes a detector that is configured to detect a thickness of the at least one article being received by the throat, and a controller that is operable to perform a predetermined operation responsive to the detector detecting that the thickness of the at least one article is at least equal to a predetermined maximum thickness.

7 Claims, 9 Drawing Sheets

U.S. PATENT DOCUMENTS

| | | | | |
|---|---|---|---|---|
| 3,829,850 | A | 8/1974 | Guetersloh | |
| 3,929,850 | A * | 12/1975 | Streck et al. | 556/431 |
| 3,947,734 | A * | 3/1976 | Fyler | 361/181 |
| 4,192,467 | A | 3/1980 | Hatanaka | |
| 4,352,980 | A | 10/1982 | Hibari | |
| 4,378,717 | A | 4/1983 | Schneider et al. | |
| 4,489,897 | A | 12/1984 | Turner | |
| 4,495,456 | A | 1/1985 | Vercillo et al. | |
| 4,497,478 | A | 2/1985 | Reschenhofer | |
| 4,683,381 | A | 7/1987 | Dufoug | |
| 4,683,391 | A | 7/1987 | Dufoug | |
| 4,707,704 | A | 11/1987 | Allen | |
| 4,757,949 | A | 7/1988 | Horton | |
| 4,814,632 | A | 3/1989 | Glaeser | |
| 4,815,669 | A | 3/1989 | Fujii | |
| 4,842,205 | A | 6/1989 | Araki | |
| 4,889,291 | A | 12/1989 | Goldhammer et al. | |
| 4,890,797 | A | 1/1990 | Fujii et al. | |
| 4,914,721 | A | 4/1990 | Glaeser | |
| 5,017,972 | A | 5/1991 | Daughton | |
| 5,081,406 | A | 1/1992 | Hughes et al. | |
| 5,139,205 | A | 8/1992 | Gallagher et al. | |
| 5,166,406 | A | 11/1992 | Vranish | |
| 5,166,679 | A | 11/1992 | Vranish et al. | |
| 5,167,374 | A | 12/1992 | Strohmeyer | |
| 5,186,398 | A | 2/1993 | Vigneau, Jr. | |
| 5,198,777 | A | 3/1993 | Masuda et al. | |
| 5,342,033 | A | 8/1994 | Iwata | |
| 5,345,138 | A | 9/1994 | Mukaidono et al. | |
| 5,353,468 | A | 10/1994 | Yap | |
| 5,397,890 | A | 3/1995 | Schueler et al. | |
| 5,409,171 | A | 4/1995 | Stangenberg et al. | |
| 5,415,355 | A | 5/1995 | Gollwitzer | |
| 5,429,313 | A | 7/1995 | Schwelling | |
| 5,453,644 | A | 9/1995 | Yap | |
| 5,494,229 | A | 2/1996 | Rokos | |
| 5,539,322 | A | 7/1996 | Zoughi et al. | |
| 5,662,280 | A | 9/1997 | Nishio et al. | |
| 5,743,521 | A | 4/1998 | Munakata et al. | |
| 5,772,129 | A | 6/1998 | Nishio et al. | |
| 5,775,605 | A | 7/1998 | Tsai | |
| 5,823,529 | A | 10/1998 | Mandel | |
| 5,850,342 | A | 12/1998 | Nakamura et al. | |
| 5,871,162 | A | 2/1999 | Rajewski | |
| 5,924,637 | A | 7/1999 | Niederholtmeyer | |
| D412,716 | S | 8/1999 | Kroger | |
| 5,942,975 | A | 8/1999 | Sorenson | |
| D414,198 | S | 9/1999 | Iwata | |
| 5,988,542 | A | 11/1999 | Henreckson | |
| 6,065,696 | A | 5/2000 | Tsai | |
| D426,805 | S | 6/2000 | Iwata | |
| 6,079,645 | A | 6/2000 | Henreckson et al. | |
| 6,116,528 | A | 9/2000 | Schwelling | |
| 6,141,883 | A | 11/2000 | Mitchell et al. | |
| 6,265,682 | B1 | 7/2001 | Lee | |
| 6,376,939 | B1 | 4/2002 | Suzuki et al. | |
| 6,418,004 | B1 | 7/2002 | Mather et al. | |
| 6,518,497 | B1 * | 2/2003 | Allaire et al. | 174/40 R |
| 6,550,701 | B1 | 4/2003 | Chang | |
| 6,561,444 | B1 | 5/2003 | Yokomine et al. | |
| 6,601,787 | B1 | 8/2003 | Langenecker | |
| 6,655,943 | B1 | 12/2003 | Peterson | |
| 6,666,959 | B2 | 12/2003 | Uzoh et al. | |
| 6,676,460 | B1 | 1/2004 | Motsenbocker | |
| 6,698,640 | B2 | 3/2004 | Hakozaki | |
| 6,724,324 | B1 | 4/2004 | Lambert | |
| 6,802,465 | B1 | 10/2004 | Norcott et al. | |
| 6,813,983 | B2 | 11/2004 | Gass et al. | |
| 6,826,988 | B2 | 12/2004 | Gass | |
| 6,857,345 | B2 | 2/2005 | Gass | |
| 6,877,410 | B2 | 4/2005 | Gass et al. | |
| 6,880,440 | B2 | 5/2005 | Gass et al. | |
| 6,920,814 | B2 | 7/2005 | Gass et al. | |
| 6,979,813 | B2 | 12/2005 | Avril | |
| 6,983,903 | B2 | 1/2006 | Chang | |
| 6,997,408 | B2 | 2/2006 | Watano | |
| 7,025,293 | B2 | 4/2006 | Matlin et al. | |
| 7,040,559 | B2 | 5/2006 | Matlin | |
| 7,166,561 | B2 | 1/2007 | Allen | |
| 7,210,867 | B1 * | 5/2007 | Silverbrook | 400/58 |
| 7,213,780 | B2 | 5/2007 | Chen | |
| 7,311,276 | B2 | 12/2007 | Matlin et al. | |
| 7,490,786 | B2 | 2/2009 | Matlin et al. | |
| 7,520,452 | B2 | 4/2009 | Watano et al. | |
| 7,584,545 | B2 | 9/2009 | Pan et al. | |
| 7,624,938 | B2 | 12/2009 | Aries et al. | |
| 7,631,822 | B2 | 12/2009 | Matlin et al. | |
| 7,631,823 | B2 | 12/2009 | Matlin et al. | |
| 7,631,824 | B2 | 12/2009 | Matlin et al. | |
| 7,635,102 | B2 | 12/2009 | Matlin et al. | |
| 7,661,612 | B2 | 2/2010 | Lee et al. | |
| 7,661,614 | B2 | 2/2010 | Matlin et al. | |
| 7,663,769 | B2 | 2/2010 | Hayashihara et al. | |
| 7,712,688 | B2 | 5/2010 | Priester | |
| 7,712,689 | B2 | 5/2010 | Matlin et al. | |
| 2002/0017175 | A1 | 2/2002 | Gass et al. | |
| 2002/0017176 | A1 | 2/2002 | Gass et al. | |
| 2002/0017178 | A1 | 2/2002 | Gass et al. | |
| 2002/0017179 | A1 | 2/2002 | Gass et al. | |
| 2002/0017180 | A1 | 2/2002 | Gass et al. | |
| 2002/0017181 | A1 | 2/2002 | Gass et al. | |
| 2002/0017182 | A1 | 2/2002 | Gass et al. | |
| 2002/0017184 | A1 | 2/2002 | Gass et al. | |
| 2002/0017336 | A1 | 2/2002 | Gass et al. | |
| 2002/0020261 | A1 | 2/2002 | Gass et al. | |
| 2002/0020262 | A1 | 2/2002 | Gass et al. | |
| 2002/0020263 | A1 | 2/2002 | Gass et al. | |
| 2002/0020265 | A1 | 2/2002 | Gass et al. | |
| 2002/0020271 | A1 | 2/2002 | Gass et al. | |
| 2002/0056348 | A1 | 5/2002 | Gass et al. | |
| 2002/0056349 | A1 | 5/2002 | Gass et al. | |
| 2002/0056350 | A1 | 5/2002 | Gass et al. | |
| 2002/0059853 | A1 | 5/2002 | Gass et al. | |
| 2002/0059854 | A1 | 5/2002 | Gass et al. | |
| 2002/0059855 | A1 | 5/2002 | Gass et al. | |
| 2002/0066346 | A1 | 6/2002 | Gass et al. | |
| 2002/0069734 | A1 | 6/2002 | Gass et al. | |
| 2002/0170399 | A1 | 11/2002 | Gass et al. | |
| 2002/0170400 | A1 | 11/2002 | Gass | |
| 2002/0190581 | A1 | 12/2002 | Gass et al. | |
| 2003/0002942 | A1 | 1/2003 | Gass et al. | |
| 2003/0005588 | A1 | 1/2003 | Gass et al. | |
| 2003/0015253 | A1 | 1/2003 | Gass et al. | |
| 2003/0016365 | A1 * | 1/2003 | Liess et al. | 356/498 |
| 2003/0019341 | A1 | 1/2003 | Gass et al. | |
| 2003/0020336 | A1 | 1/2003 | Gass et al. | |
| 2003/0037651 | A1 | 2/2003 | Gass et al. | |
| 2003/0042342 | A1 | 3/2003 | Kroger et al. | |
| 2003/0056853 | A1 | 3/2003 | Gass et al. | |
| 2003/0058121 | A1 | 3/2003 | Gass et al. | |
| 2003/0090224 | A1 | 5/2003 | Gass et al. | |
| 2003/0131703 | A1 | 7/2003 | Gass et al. | |
| 2003/0140749 | A1 | 7/2003 | Gass et al. | |
| 2003/0196824 | A1 | 10/2003 | Gass et al. | |
| 2004/0008122 | A1 | 1/2004 | Michael | |
| 2004/0040426 | A1 | 3/2004 | Gass et al. | |
| 2004/0069883 | A1 | 4/2004 | Watanabe et al. | |
| 2004/0159198 | A1 | 8/2004 | Peot et al. | |
| 2004/0163514 | A1 | 8/2004 | Gass et al. | |
| 2004/0173430 | A1 | 9/2004 | Gass | |
| 2004/0194594 | A1 | 10/2004 | Dils et al. | |
| 2004/0226800 | A1 | 11/2004 | Pierga | |
| 2005/0039586 | A1 | 2/2005 | Gass et al. | |
| 2005/0039822 | A1 | 2/2005 | Gass et al. | |
| 2005/0041359 | A1 | 2/2005 | Gass | |
| 2005/0046651 | A1 * | 3/2005 | Askren et al. | 347/12 |
| 2005/0066784 | A1 | 3/2005 | Gass | |
| 2005/0103510 | A1 | 5/2005 | Gass et al. | |
| 2005/0139051 | A1 | 6/2005 | Gass et al. | |
| 2005/0139056 | A1 | 6/2005 | Gass et al. | |
| 2005/0139057 | A1 | 6/2005 | Gass et al. | |
| 2005/0139058 | A1 | 6/2005 | Gass et al. | |
| 2005/0139459 | A1 | 6/2005 | Gass et al. | |
| 2005/0150986 | A1 | 7/2005 | Castronovo | |
| 2005/0155473 | A1 | 7/2005 | Gass | |
| 2005/0166736 | A1 | 8/2005 | Gass et al. | |
| 2005/0213106 | A1 * | 9/2005 | Weijers et al. | 356/519 |

| | | | |
|---|---|---|---|
| 2006/0016919 | A1 | 1/2006 | Castronovo |
| 2006/0054725 | A1 | 3/2006 | Matlin |
| 2006/0091247 | A1 | 5/2006 | Matlin |
| 2006/0243631 | A1 | 11/2006 | Duke |
| 2007/0007373 | A1 | 1/2007 | Matlin |
| 2007/0025239 | A1 | 2/2007 | Jain et al. |
| 2007/0063082 | A1 | 3/2007 | Coleman |
| 2007/0080252 | A1 | 4/2007 | Pierce |
| 2007/0087942 | A1 | 4/2007 | Allen |
| 2007/0164135 | A1 | 7/2007 | Zhong |
| 2007/0164138 | A1 | 7/2007 | Allen |
| 2007/0215728 | A1 | 9/2007 | Priester |
| 2007/0221767 | A1 | 9/2007 | Matlin et al. |
| 2008/0093487 | A1 | 4/2008 | Lee |
| 2008/0231261 | A1 | 9/2008 | Dengler et al. |
| 2009/0025239 | A1 | 1/2009 | Pan |
| 2009/0032629 | A1 | 2/2009 | Aries et al. |
| 2009/0090797 | A1 | 4/2009 | Matlin et al. |
| 2010/0051731 | A1 | 3/2010 | Matlin et al. |
| 2010/0084496 | A1 | 4/2010 | Matlin et al. |
| 2010/0102153 | A1 | 4/2010 | Matlin et al. |
| 2010/0134805 | A1 | 6/2010 | Pan |
| 2010/0170967 | A1 | 7/2010 | Jensen et al. |
| 2010/0170969 | A1 | 7/2010 | Jensen et al. |
| 2010/0176227 | A1 | 7/2010 | Davis et al. |
| 2010/0181398 | A1 | 7/2010 | Davis et al. |
| 2010/0213296 | A1 | 8/2010 | Sued et al. |
| 2010/0213297 | A1 | 8/2010 | Sued et al. |
| 2010/0213300 | A1 | 8/2010 | Matlin et al. |
| 2010/0243774 | A1 | 9/2010 | Hu et al. |
| 2010/0252661 | A1 | 10/2010 | Matlin et al. |
| 2010/0252664 | A1 | 10/2010 | Matlin et al. |
| 2010/0270404 | A1 | 10/2010 | Chen |
| 2010/0282879 | A1 | 11/2010 | Chen |
| 2010/0288861 | A1 | 11/2010 | Cai et al. |
| 2010/0320297 | A1 | 12/2010 | Matlin et al. |
| 2010/0320299 | A1 | 12/2010 | Matlin et al. |
| 2011/0272504 | A1 | 11/2011 | Matlin et al. |
| 2011/0272505 | A1 | 11/2011 | Matlin et al. |
| 2011/0280642 | A1* | 11/2011 | Ikeda et al. ..... 400/582 |
| 2011/0297769 | A1 | 12/2011 | Matlin et al. |
| 2011/0297770 | A1 | 12/2011 | Matlin et al. |

FOREIGN PATENT DOCUMENTS

| | | | |
|---|---|---|---|
| DE | 4121330 | | 1/1993 |
| DE | 4207292 | | 1/1993 |
| DE | 4237861 | | 5/1994 |
| DE | 4437348 | | 4/1996 |
| DE | 19835093 | | 2/1999 |
| DE | 202004000907 | | 5/2005 |
| DE | 102006036136 | | 1/2008 |
| DE | 202010001577 | U1 | 11/2010 |
| EP | 268244 | | 11/1987 |
| EP | 0392867 | | 10/1990 |
| EP | 562076 | | 9/1992 |
| EP | 524708 | | 1/1997 |
| EP | 0792691 | | 9/1997 |
| EP | 0818241 | | 1/1998 |
| EP | 856945 | | 1/1998 |
| EP | 855 221 | A | 7/1998 |
| EP | 855221 | | 7/1998 |
| EP | 1177832 | | 2/2002 |
| EP | 1195202 | | 4/2002 |
| EP | 2180290 | | 7/2008 |
| EP | 2022566 | | 2/2009 |
| GB | 1199903 | | 7/1970 |
| GB | 2171029 | | 8/1986 |
| GB | 2209963 | | 6/1989 |
| GB | 1199903 | | 7/1990 |
| GB | 2 440 651 | A | 2/2008 |
| GB | 2440651 | | 2/2008 |
| GB | 2442942 | | 4/2008 |
| GB | 2451513 | | 2/2009 |
| JP | 52-11691 | | 1/1977 |
| JP | 5311911 | | 3/1978 |
| JP | 57-76734 | | 1/1980 |
| JP | 57-070445 (U) | | 4/1982 |
| JP | 57-76734 | | 5/1982 |
| JP | 58-223448 | | 12/1983 |
| JP | 59150554 | | 8/1984 |
| JP | 61-000702 | | 1/1986 |
| JP | 62183555 | | 11/1987 |
| JP | 63-173342 | | 11/1988 |
| JP | 2-277560 | | 11/1990 |
| JP | H2-303550 | | 12/1990 |
| JP | 04-157093 | | 5/1992 |
| JP | 04-0180852 | | 6/1992 |
| JP | 5-96198 | | 4/1993 |
| JP | H05-092144 | | 4/1993 |
| JP | 6-277548 | | 10/1994 |
| JP | 7-299377 | | 11/1995 |
| JP | 8-108088 | | 4/1996 |
| JP | 8-131861 | | 5/1996 |
| JP | 08-131962 | | 5/1996 |
| JP | 08-164343 | | 6/1996 |
| JP | 9-38513 | | 2/1997 |
| JP | 09075763 | | 3/1997 |
| JP | 09-150069 | | 10/1997 |
| JP | 9-262491 | | 10/1997 |
| JP | 10-048344 | | 2/1998 |
| JP | 11-216383 | | 8/1999 |
| JP | 11-304942 | | 11/1999 |
| JP | 2000346288 | | 12/2000 |
| JP | 2002-239405 | | 8/2002 |
| JP | 2004-321840 | | 11/2004 |
| JP | 2004321993 | | 11/2004 |
| WO | 2005070553 | | 8/2005 |
| WO | 2006019985 | | 2/2006 |
| WO | 2006036370 | | 4/2006 |
| WO | 2007/109753 | A2 | 9/2007 |
| WO | 2007109753 | | 9/2007 |
| WO | 2007122364 | | 11/2007 |
| WO | 2007137761 | | 12/2007 |

OTHER PUBLICATIONS

Complaint for Declaratory Judgment filed on Nov. 15, 2010 by Royal Applicance Manufacturing Co., d/b/a/ TTI Floor Care North America and Techtronic Industries Co. Ltd. against Fellowes, Inc.

First Amended Complaint filed on Aug. 19, 2011 by Fellowes, Inc., in the case of *Fellowes, Inc.* v. *ACCO Brands Corp., et al.* (Northern District of Illinois Civil Action No. 1:11-cv-04229).

Answer to First Amended Complaint filed on Sep. 6, 2011 by ACCO Brands Corporation, in the case of *Fellowes, Inc.* v. *ACCO Brands Corp., et al.* (Northern District of Illinois Civil Action No. 1:11-cv-04229).

Plaintiff's Initial Invalidity Contentions filed on Sep. 12, 2011 by Royal Appliance Manufacturing Co., in the case of *Royal Appliance Manufacturing Co., d/b/a TTI Floor Care North America and Techtronic Industries Co., Ltd.* v. *Fellowes, Inc.,* filed in the Northern District of Ohio (Case No. 1:10-cv-2604).

Defendant's Initial Validity Contentions filed on Oct. 3, 2011 by Fellowes, Inc., in the case of *Royal Appliance Manufacturing Co., d/b/a TTI Floor Care North America and Techtronic Industries Co., Ltd.* v. *Fellowes, Inc.,* filed in the Northern District of Ohio (Case No. 1:10-cv-2604).

Plaintiff's Initial Noninfringement Contentions filed on Sep. 12, 2011 by Royal Appliance Manufacturing Co., in the case of *Royal Appliance Manufacturing Co., d/b/a TTI Floor Care North America and Techtronic Industries Co., Ltd.* v. *Fellowes, Inc.,* filed in the Northern District of Ohio (Case No. 1:10-cv-2604).

Fellowes' Initial Validity Contentions filed on Oct. 26, 2011 by Fellowes, Inc., in the case of *Royal Appliance Manufacturing Co., d/b/a TTI Floor Care North America and Techtronic Industries Co., Ltd.* v. *Fellowes, Inc.,* filed in the Northern District of Ohio (Case No. 1:10-cv-2604).

Plaintiff's Preliminary Invalidity and Unenforceability Contentions filed on Sep. 2, 2011 by Royal Appliance Manufacturing Co., in the case of *Royal Appliance Manufacturing Co., d/b/a TTI Floor Care North America, et al.* v. *Fellowes, Inc.,* filed in the Northern District of Ohio (Case No. 1:11 CV 01276).

Defendant's Validity and Enforceability Contentions filed on Sep. 26, 2011 by Fellowes, Inc., in the case of *Royal Appliance Manufacturing Co., d/b/a TTI Floor Care North America, et al.* v. *Fellowes, Inc.,* filed in the Northern District of Ohio (Case No. 1:11 CV 01276).

GBC Shredmaster Service Manual, Part #6001054, referencing Models 2230S and 2250X Paper Shredders, Nov. 1997.
ACCO Rexel, Mainstream 1050/2150/2250/3150/3250 and 3350, 115V Machines Illustrated Parts Lists and Services Instructions, Mar. 25, 2002, Issue No. 4.
ACCO Rexel, Deckside and Office 115V Machines Illustrated Parts Lists and Service Instructions, Aug. 18, 1999.
ACCO Rexel, Deckside and Office 230V Machines Illustrated Parts Lists and Service Instructions, Aug. 1, 2000.
U.S. Appl. No. 60/613,750, filed Sep. 27, 2004, Pierce.
U.S. Appl. No. 60/686,490, filed May 31, 2005, Pierce.
U.S. Appl. No. 60/688,285, filed Jun. 7, 2005, Pierce.
The Stationary and Business Machines—Japan, "DS-4000 by Carl Jimuki K.K.", Jun. 2003.
The Stationary and Business Machines—Japan, "NSE-501CN by Nakabayashi K.K.", Oct. 2004.
Plaintiffs' Opening Claim Construction Brief filed on Jun. 1, 2012 by Royal Appliance Manufacturing Co., in the case of *Royal Appliance Manufacturing Co., d/b/a TTI Floor Care North America and Techtronic Industries Co., Ltd.* v. *Fellowes, Inc.,* filed in the Northern District of Ohio (Case No. 1:10-cv-2604).
Defendant's Opening Claim Construction Brief filed on Jun. 1, 2012 by Fellowes, Inc., in the case of *Royal Appliance Manufacturing Co., d/b/a TTI Floor Care North America and Techtronic Industries Co., Ltd.* v. *Fellowes, Inc.,* filed in the Northern District of Ohio (Case Nos. 1:10-cv-2604, 11-cv-1276, 11-cv-2617 and 12-cv-23).
Request for Inter Partes Reexamination As Filed in the U.S. Patent and Trademark Office on Aug. 23, 2011, regarding U.S. Patent No. 7,963,468.
Correction Document Containing Replacement Explanation Filed in Response to Notice of Failure to Comply with Inter Partes Reexamination Request Filing Requirements as filed in the U.S. Patent and Trademark Office on Sep. 2, 2011, regarding U.S. Appl. No. 95/001,723 (Patent No. 7,963,468).
Order Granting Request for Inter Partes Reexamination with an Office Action regarding U.S. Appl. No. 95/001,723 (Patent No. 7,963,468), issued by the U.S. Patent and Trademark Office on Nov. 10, 2011.
Office Action for Inter Partes Reexamination regarding U.S. Appl. No. 95/001,723 (Patent No. 7,963,468), issued by the U.S. Patent and Trademark Office on Nov. 10, 2011.
Patentee Response to Office Action in Inter Partes Reexamination as filed in the U.S. Patent and Trademark Office on Jan. 10, 2012, regarding U.S. Appl. No. 95/001,723 (Patent No. 7,963,468).
Requester's Comments on Patentee's Response to Office Action as filed in the U.S. Patent and Trademark Office on Feb. 8, 2012, regarding U.S. Appl. No. 95/001,723 (Patent No. 7,963,468).
Action Closing Prosecution regarding U.S. Appl. No. 95/001,723 (Patent No. 7,963,468), issued by the U.S. Patent and Trademark Office on May 8, 2012.
Patentee Response to Office Action in Inter Partes Reexamination as filed in the U.S. Patent and Trademark Office on May 14, 2012, regarding U.S. Appl. No. 95/001,723 (Patent No. 7,963,468).
Request for Inter Partes Reexamination As Filed in the U.S. Patent and Trademark Office on Sep. 2, 2011, regarding U.S. Patent No. 7,631,822.
Order Granting Request for Inter Partes Reexamination regarding U.S. Appl. No. 95/001,736 (Patent No. 7,631,822), issued by the U.S. Patent and Trademark Office on Oct. 26, 2011.
Office Action in Inter Partes Reexamination regarding U.S. Appl. No. 95/001,736 (Patent No. 7,631,822), issued by the U.S. Patent and Trademark Office on Nov. 10, 2011.
Partial International Search Report issued with Invitation to Pay Additional Fees issued in PCT/US2008/078458, Jan. 26, 2009, 2 pages.
International Search Report (PCT/ISA/210) issued in PCT/US2007/0064601, mailed Feb. 8, 2008, 5 pages.
Written Opinion of the International Searching Authority (PCT/ISA/237) issued in PCT/US2007/0064601, mailed Feb. 8, 2008, 16 pages.
English Abstract of German patent application No. DE 1020006036136 of Erlecke, published Jan. 31, 2008.
TI's Digital Signal Controllers Put Brake On SawStop Table Saw, Feb. 9, 2005, pp. 1-3 (printed from www.embeddedstar.com/press/content/2005/2/embedded17827.html).
European Search Report issued in EP 08 17 0857, Feb. 10, 2009, 6 pages.
International Search Report for PCT/US2006/000010 dated May 11, 2006.
European Search Report issued in Application No. 08102126.3, May 19, 2008, 5 pages.
Manual Translation of Japanese application 2004-321993, published Nov. 18, 2004.
Manual Translation of Japanese application 2002-239405, published Aug. 27, 2002.
Invitation to Pay Additional Fees with Partial International Search Report in PCT/US2007/064601, Sep. 12, 2007, 8 pages.

* cited by examiner

SHREDDER WITH THICKNESS DETECTOR

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of and claims priority to U.S. patent application Ser. No. 11/177,480, filed on Jul. 11, 2005 and [currently pending] *now U.S. Pat. No. 7,661,614*, the entire contents of which is incorporated herein by reference. This application is also a continuation-in-part of and claims priority to U.S. patent application Ser. No. 11/385,864, filed on Mar. 22, 2006 and [currently pending] *now U.S. Pat. No. 7,798,435*, the entire content of which is incorporated herein by reference.

BACKGROUND OF THE INVENTION

1. Field of the Invention

The present invention relates to shredders for destroying articles, such as documents, compact discs, etc.

2. Description of Related Art

Shredders are well known devices for destroying articles, such as documents, compact discs ("CDs"), expired credit cards, etc. Typically, users purchase shredders to destroy sensitive articles, such as credit card statements with account information, documents containing company trade secrets, etc.

A common type of shredder has a shredder mechanism contained within a housing that is removably mounted atop a container. The shredder mechanism typically has a series of cutter elements that shred articles fed therein and discharge the shredded articles downwardly into the container. The shredder typically has a stated capacity, such as the number of sheets of paper (typically of 20 lb. weight) that may be shredded at one time; however, the feed throat of a typical shredder can receive more sheets of paper than the stated capacity. A common frustration of users of shredders is to feed too many papers into the feed throat, only to have the shredder jam after it has started to shred the papers. To free the shredder of the papers, the user typically reverses the direction of rotation of the cutter elements via a switch until the papers become free.

In addition, shredders that are subjected to a lot of use should have periodic maintenance done to them. For example, the cutter elements may become dull over time. It has been found that lubricating the cutter elements may improve the performance of cutter elements, particularly if the shredder is used constantly over a long period of time.

The present invention endeavors to provide various improvements over known shredders.

BRIEF SUMMARY OF THE INVENTION

It is an aspect of the invention to provide a shredder that does not jam as a result of too many papers, or an article that is too thick, being fed into the shredder.

In an embodiment, a shredder is provided. The shredder includes a housing having a throat for receiving at least one article to be shredded, and a shredder mechanism received in the housing. The shredder mechanism includes an electrically powered motor and cutter elements. The shredder mechanism enables the at least one article to be shredded to be fed into the cutter elements. The motor is operable to drive the cutter elements so that the cutter elements shred the articles fed therein. The shredder also includes a detector that is configured to detect a thickness of the at least one article being received by the throat, and a controller that is operable to perform a predetermined operation responsive to the detector detecting that the thickness of the at least one article is at least equal to a predetermined maximum thickness.

In an embodiment, a method for operating a shredder is provided. The method includes detecting a thickness of at least one article being inserted into a throat of the shredder, determining if the thickness of the at least one article is greater than a predetermined maximum thickness, and performing a predetermined operation if the detected thickness is at least equal to the predetermined maximum thickness.

It is also an aspect of the present invention to provide a shredder that automatically conducts self-maintenance after a predetermined amount of use.

In an embodiment, a shredder that includes a housing that has a throat for receiving at least one article to be shredded, and a shredder mechanism that is received in the housing is provided. The shredder mechanism includes an electrically powered motor and cutter elements. The shredder mechanism enables the at least one article to be shredded to be fed into the cutter elements and the motor being operable to drive the cutter elements so that the cutter elements shred the articles fed therein. The shredder also includes a lubrication system configured to lubricate the cutter elements, and a detector configured to detect a thickness of the at least one article being received by the throat. The shredder further includes a controller that is operable to store an accumulation of thicknesses detected by the detector over time and to provide a signal to the lubrication system to lubricate the cutter elements when the accumulation is at least equal to a predetermined total thickness.

In an embodiment, a shredder is provided. The shredder includes a housing having a throat for receiving at least one article to be shredded, and a shredder mechanism that is received in the housing. The shredder mechanism includes an electrically powered motor and cutter elements. The shredder mechanism enables the at least one article to be shredded to be fed into the cutter elements. The motor is operable to drive the cutter elements so that the cutter elements shred the articles fed therein. The shredder also includes a controller that includes a memory. The controller is operable to store information in the memory related to an amount of use of the shredder, and to alert a user of the shredder when the shredder is due for a maintenance operation, based on the amount of use of the shredder.

Other aspects, features, and advantages of the present invention will become apparent from the following detailed description, the accompanying drawings, and the appended claims.

DETAILED DESCRIPTION OF THE INVENTION

Figure 1:
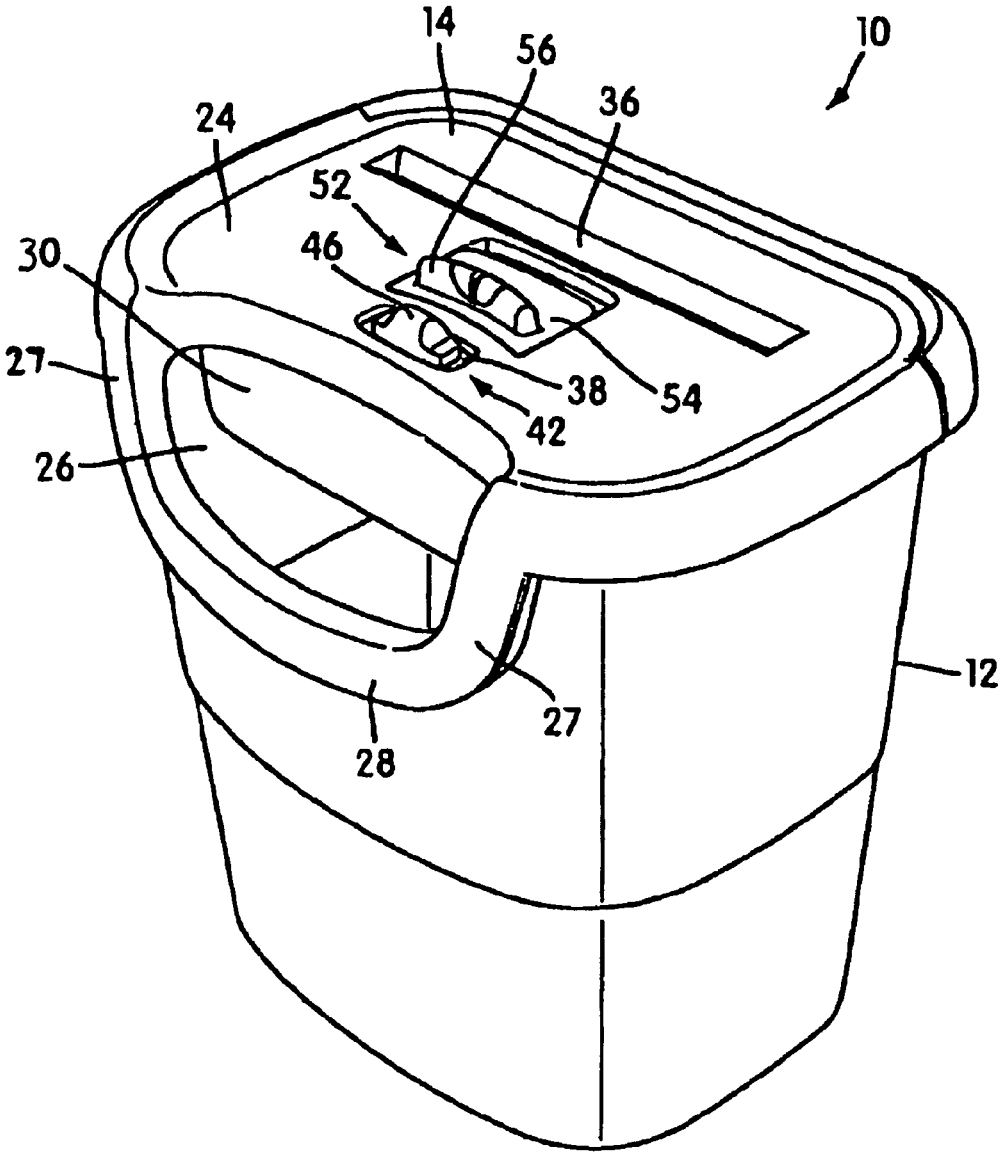
FIG. 1 is a perspective view of a shredder constructed in accordance with an embodiment of the present invention.
Figure 2:
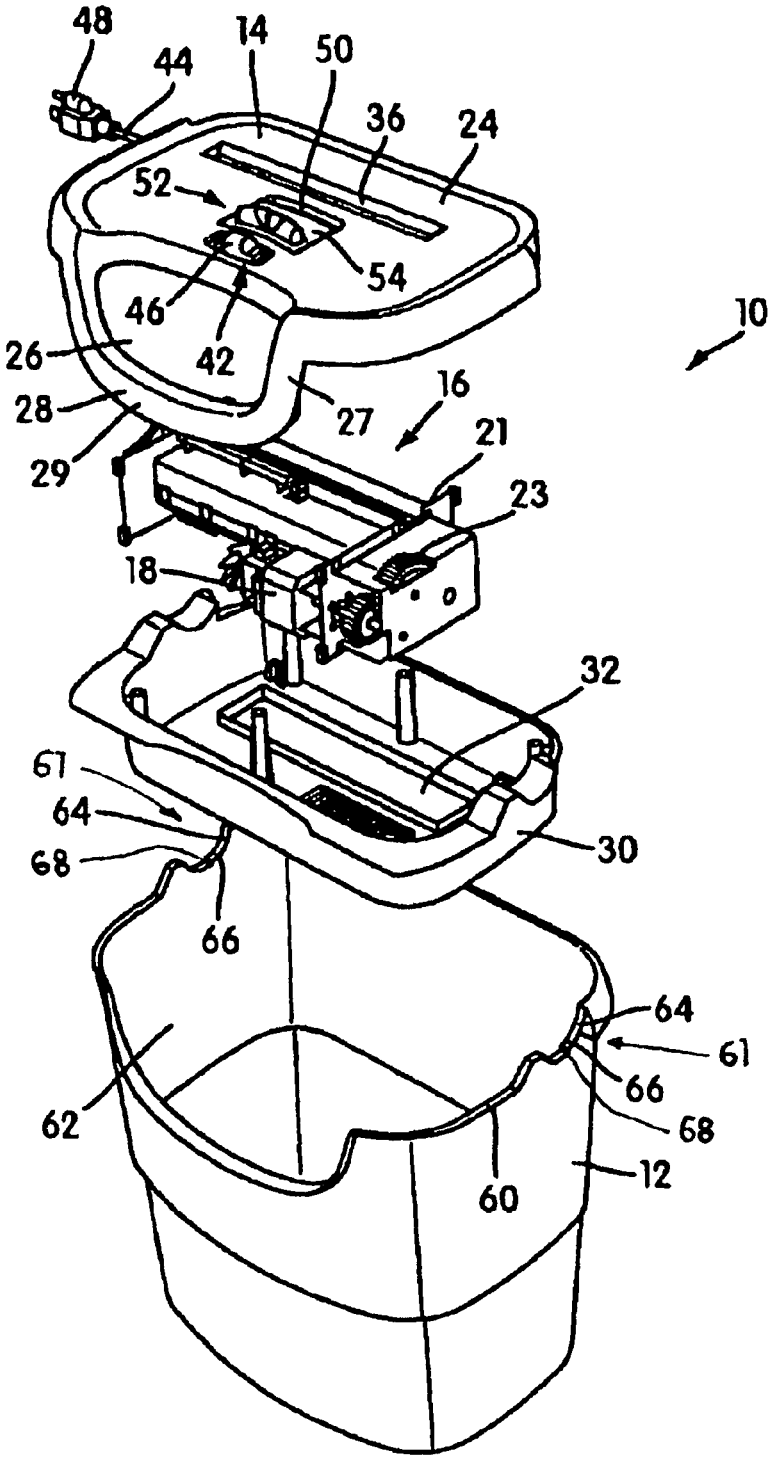
FIG. 2 is an exploded perspective view of the shredder of FIG. 1.

FIGS. 1 and 2 illustrate a shredder constructed in accordance with an embodiment of the present invention. The shredder is generally indicated at 10. In the illustrated embodiment, the shredder 10 sits atop a waste container, generally indicated at 12, which is formed of molded plastic or any other material. The shredder 10 illustrated is designed specifically for use with the container 12, as the shredder housing 14 sits on the upper periphery of the waste container 12 in a nested relation. However, the shredder 10 may also be designed so as to sit atop a wide variety of standard waste containers, and the shredder 10 would not be sold with the container. Likewise, the shredder 10 could be part of a large freestanding housing, and a waste container would be enclosed in the housing. An access door would provide for access to and removal of the container. Generally speaking, the shredder 10 may have any suitable construction or configuration and the illustrated embodiment is not intended to be limiting in any way. In addition, the term "shredder" is not intended to be limited to devices that literally "shred" documents and articles, but is instead intended to cover any device that destroys documents and articles in a manner that leaves each document or article illegible and/or useless.

As shown in FIG. 2, in an embodiment, the shredder 10 includes a shredder mechanism 16 that includes an electrically powered motor 18 and a plurality of cutter elements 19. "Shredder mechanism" is a generic structural term to denote a device that destroys articles using at least one cutter element. Such destroying may be done in any particular way. For example, the shredder mechanism may include at least one cutter element that is configured to punch a plurality of holes in the document or article in a manner that destroys the document or article. In the illustrated embodiment, the cutter elements 19 are generally mounted on a pair of parallel rotating shafts 20. The motor 18 operates using electrical power to rotatably drive the shafts and the cutter elements through a conventional transmission 23 so that the cutter elements shred articles fed therein. The shredder mechanism 16 may also include a sub-frame 21 for mounting the shafts, the motor 18, and the transmission 23. The operation and construction of such a shredder mechanism 16 are well known and need not be described herein in detail. Generally, any suitable shredder mechanism 16 known in the art or developed hereafter may be used.

The shredder 10 also includes the shredder housing 14, mentioned above. The shredder housing 14 includes top wall 24 that sits atop the container 12. The top wall 24 is molded from plastic and an opening 26 is located at a front portion thereof. The opening 26 is formed in part by a downwardly depending generally U-shaped member 28. The U-shaped member 28 has a pair of spaced apart connector portions 27 on opposing sides thereof and a hand grip portion 28 extending between the connector portions 27 in spaced apart relation from the housing 14. The opening 26 allows waste to be discarded into the container 12 without being passed through the shredder mechanism 16, and the member 28 may act as a handle for carrying the shredder 10 separate from the container 12. As an optional feature, this opening 26 may be provided with a lid, such as a pivoting lid, that opens and closes the opening 26. However, this opening in general is optional and may be omitted entirely. Moreover, the shredder housing 14 and its top wall 24 may have any suitable construction or configuration.

The shredder housing 14 also includes a bottom receptacle 30 having a bottom wall, four side walls and an open top. The shredder mechanism 16 is received therein, and the receptacle 30 is affixed to the underside of the top wall 24 by fasteners. The receptacle 30 has an opening 32 in its bottom wall through which the shredder mechanism 16 discharges shredded articles into the container 12.

The top wall 24 has a generally laterally extending opening, which is often referred to as a throat 36, extending generally parallel and above the cutter elements. The throat 36 enables the articles being shredded to be fed into the cutter elements. As can be appreciated, the throat 36 is relatively narrow, which is desirable for preventing overly thick items, such as large stacks of documents, from being fed into cutter elements, which could lead to jamming. The throat 36 may have any configuration.

The top wall 24 also has a switch recess 38 with an opening therethrough. An on/off switch 42 includes a switch module (not shown) mounted to the top wall 24 underneath the recess 38 by fasteners, and a manually engageable portion 46 that moves laterally within the recess 38. The switch module has a movable element (not shown) that connects to the manually engageable portion 46 through the opening. This enables movement of the manually engageable portion 46 to move the switch module between its states.

In the illustrated embodiment, the switch module connects the motor 18 to the power supply. Typically, the power supply will be a standard power cord 44 with a plug 48 on its end that plugs into a standard AC outlet. The switch 42 is movable between an on position and an off position by moving the portion 46 laterally within the recess 38. In the on position, contacts in the switch module are closed by movement of the manually engageable portion 46 and the movable element to enable a delivery of electrical power to the motor 18. In the off position, contacts in the switch module are opened to disable the delivery of electric power to the motor 18.

As an option, the switch 42 may also have a reverse position wherein contacts are closed to enable delivery of electrical power to operate the motor 18 in a reverse manner. This would be done by using a reversible motor and applying a current that is of a reverse polarity relative to the on position. The capability to operate the motor 18 in a reversing manner is desirable to move the cutter elements in a reversing direction for clearing jams. In the illustrated embodiment, in the off position the manually engageable portion 46 and the movable element would be located generally in the center of the recess 38, and the on and reverse positions would be on opposing lateral sides of the off position.

Generally, the construction and operation of the switch 42 for controlling the motor 42 are well known and any construction for such a switch 42 may be used.

In the illustrated embodiment, the top cover 24 also includes another recess 50 associated with an optional switch lock 52. The switch lock 52 includes a manually engageable portion 54 that is movable by a user's hand and a locking portion (not shown). The manually engageable portion 54 is seated in the recess 50 and the locking portion is located beneath the top wall 24. The locking portion is integrally formed as a plastic piece with the manually engageable portion 54 and extends beneath the top wall 24 via an opening formed in the recess 50.

The switch lock 52 causes the switch 42 to move from either its on position or reverse position to its off position by a camming action as the switch lock 52 is moved from a releasing position to a locking position. In the releasing position, the locking portion is disengaged from the movable element of the switch 42, thus enabling the switch 42 to be moved between its on, off, and reverse positions. In the locking position, the movable element of the switch 42 is restrained in its off position against movement to either its on or reverse position by the locking portion of the switch lock 52.

Preferably, but not necessarily, the manually engageable portion 54 of the switch lock 52 has an upwardly extending projection 56 for facilitating movement of the switch lock 52 between the locking and releasing positions.

One advantage of the switch lock 52 is that, by holding the switch 42 in the off position, to activate the shredder mechanism 16 the switch lock 52 must first be moved to its releasing position, and then the switch 42 is moved to its on or reverse position. This reduces the likelihood of the shredder mechanism 16 being activated unintentionally. Reference may be made to U.S. Patent Application Publication No. 2005-0218250 A1, which is incorporated herein by reference, for further details of the switch lock 52. This switch lock is an entirely optional feature and may be omitted.

In the illustrated embodiment, the shredder housing 14 is designed specifically for use with the container 12 and it is intended to sell them together. The upper peripheral edge 60 of the container 12 defines an upwardly facing opening 62, and provides a seat 61 on which the shredder 10 is removably mounted. The seat 61 includes a pair of pivot guides 64 provided on opposing lateral sides thereof. The pivot guides 64 include upwardly facing recesses 66 that are defined by walls extending laterally outwardly from the upper edge 60 of the container 12. The walls defining the recesses 66 are molded integrally from plastic with the container 12, but may be provided as separate structures and formed from any other material. At the bottom of each recess 66 is provided a step down or ledge providing a generally vertical engagement surface 68. This step down or ledge is created by two sections of the recesses 66 being provided with different radii. Reference may be made to U.S. Pat. No. 7,025,293, which is incorporated herein by reference, for further details of the pivotal mounting. This pivotal mounting is entirely optional and may be omitted.

Figure 3:
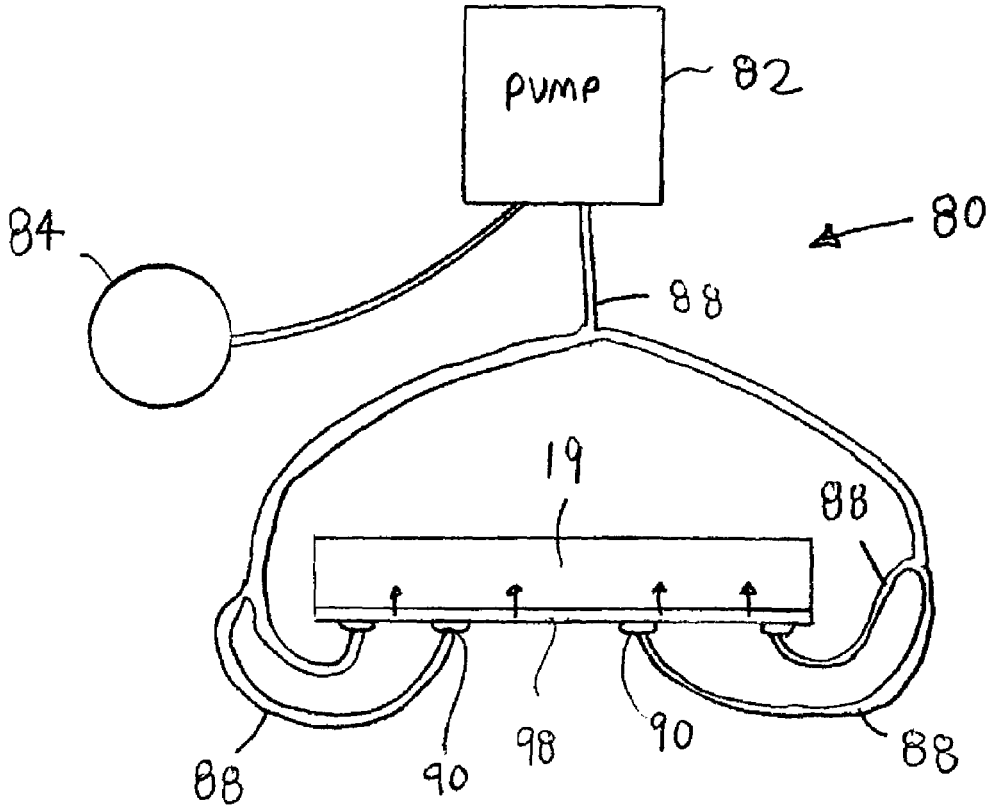
FIG. 3 is a schematic illustration of an oiling mechanism in accordance with an embodiment of the present invention.
Figure 5:
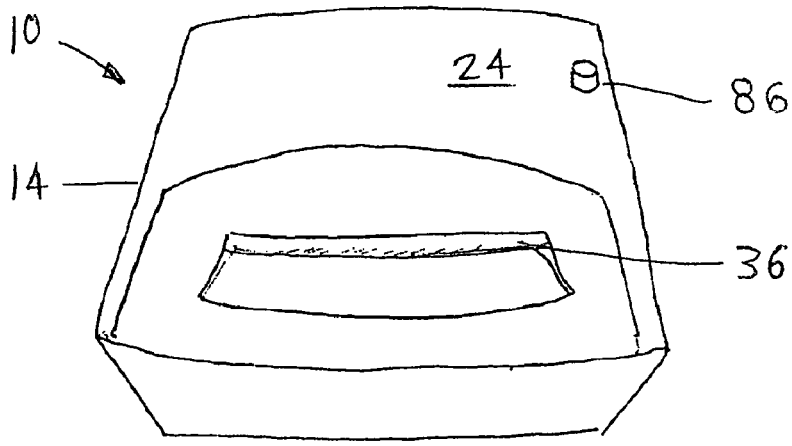
FIG. 5 is a perspective view of a shredder having an oiling mechanism in accordance with an embodiment of the present invention.

As schematically illustrated in FIG. 3, in order to lubricate the cutter elements 19 of the shredder 10, a lubrication system 80 may be included for providing lubrication at the cutter elements 19. The system includes a pump 82, that draws lubricating fluid, such as oil, from a reservoir 84. In a typical application, the reservoir 84 will have a fill neck 86 that extends through the top wall 24 of the shredder housing 14 to allow for easy access for refilling the reservoir (see FIG. 5).

The pump 82 communicates through a series of conduits 88 to one or more nozzles 90 that are positioned proximate the cutter elements 19. In one embodiment, the nozzles can be positioned such that oil forced through the nozzles is dispersed as sprayed droplets in the throat of the shredder 10. In another embodiment, the oil is dispersed in back of the throat of the shredder 10. Generally, the nozzles have openings small relative to the conduits, thereby creating a high speed flow at the nozzle, allowing the oil to be expelled at a predictable rate and pattern.

Figure 4:
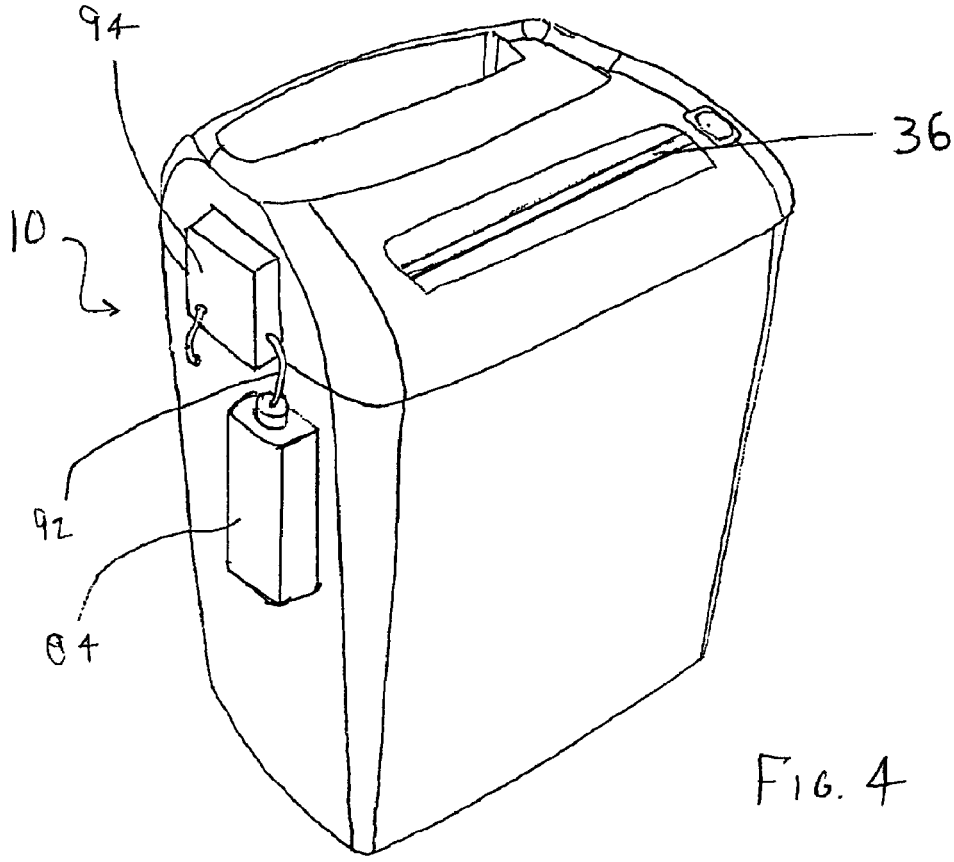
FIG. 4 is a perspective view of a shredder having an oiling mechanism in accordance with an embodiment of the present invention.

As shown in FIG. 4, a system in accordance with an embodiment of the present invention may be a retrofit device. In this embodiment, the reservoir 84 is mounted to an outside surface of the shredder 10. It is connected via a conduit 92 to the main unit 94. The main unit 94 may include a power supply (not shown) and the pump 82 (not shown in FIG. 4). In any embodiment, the reservoir 84 may be designed to be removed and replaced, rather than re-filled.

An alternate embodiment includes the system 80 built into the housing of the shredder 10. In this embodiment, shown in FIG. 5, the fill neck 86 can be designed to extend through the top wall 24 of the shredder housing 14. Operation of the system 80 does not depend on whether it is retrofit or built-in.

In operation, a controller 96 (shown in FIG. 6) for the lubrication system 80 is programmed with instructions for determining when to lubricate the cutter elements 19. The controller processes the instructions and subsequently applies them by activating the pump 82 to cause fluid from the reservoir to be delivered to the nozzles 90 under pressure. The nozzles are positioned and arranged to spray the pressurized lubricating oil to the cutter elements 19. In general, the oil will be dispersed in a predetermined pattern directly onto the cutter elements and/or the strippers. In a particular arrangement, it may be useful to array the nozzles below the cutter elements so that lubrication is sprayed from below. In an alternate embodiment, the oil is sprayed onto an intermediate surface 98 (shown in FIG. 3) and allowed to drip from there onto the cutter elements 19 and the strippers (which are generally located on the outward or post-cutting side of the cutting mechanism and include a serrated member or a comb type member having teeth that protrude into the spaces between the individual cutting disks). The illustrated embodiments of the lubrication system 80 are not intended to be limiting in any way. Reference may be made to U.S. patent application Ser. No. 11/385,864, which is hereby incorporated by reference, for further details of an oiling mechanism. The lubrication system 80 is an optional feature of the shredder 10.

Figure 6:
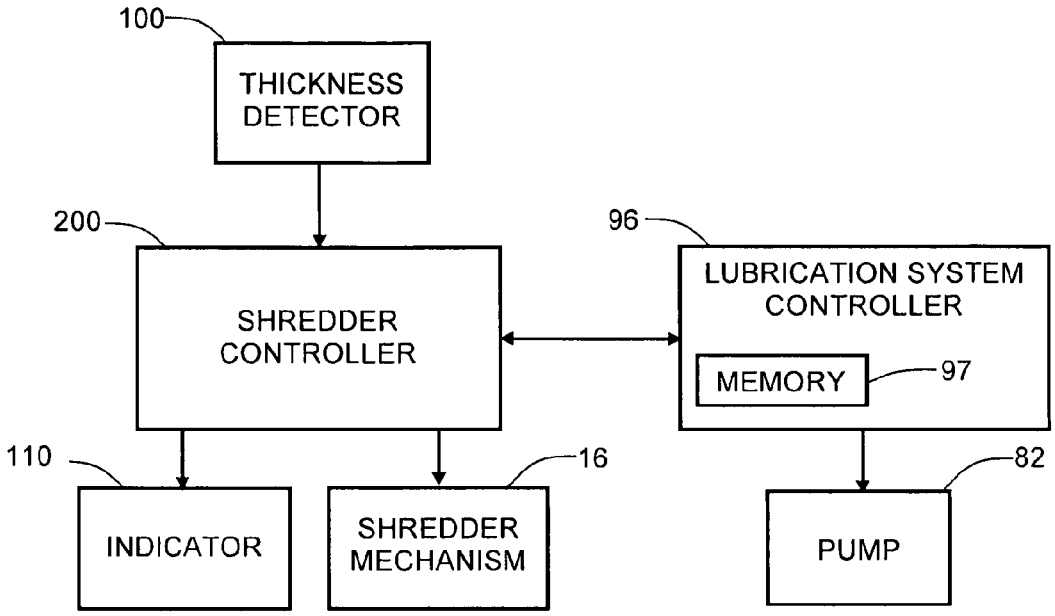
FIG. 6 is a schematic of interaction between a controller and other parts of the shredder.

In an embodiment of the invention, the shredder 10 includes a thickness detector 100 to detect overly thick stacks of documents or other articles that could jam the shredder mechanism 16, and communicate such detection to a controller 200, as shown in FIG. 6. Upon such detection, the controller 200 may communicate with an indicator 110 that provides a warning signal to the user, such as an audible signal and/or a visual signal. Examples of audible signals include, but are not limited to beeping, buzzing, and/or any other type of signal that will alert the user that the stack of documents or other article that is about to be shredded is above a predetermined maximum thickness and may cause the shredder mechanism 16 to jam. This gives the user the opportunity to reduce the thickness of the stack of documents or reconsider forcing the thick article through the shredder, knowing that any such forcing may jam and/or damage the shredder.

Figure 7:
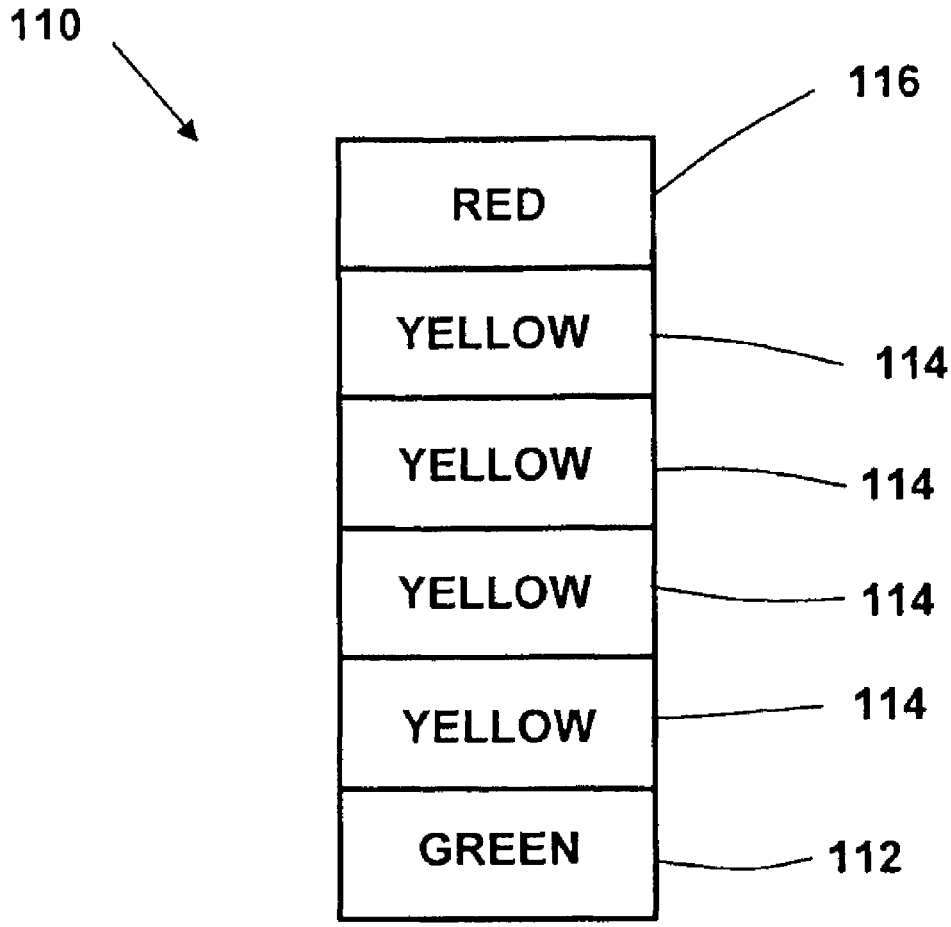
FIG. 7 is a schematic of an embodiment of an indicator located on the shredder.

A visual signal may be provided in the form of a red warning light, which may be emitted from an LED. It is also contemplated that a green light may also be provided to indicate that the shredder 10 is ready to operate. In an embodiment, the indicator 110 is a progressive indication system that includes a series of indicators in the form of lights to indicate the thickness of the stack of documents or other article relative to the capacity of the shredder is provided, as illustrated in FIG. 7. As illustrated, the progressive indication system includes a green light 112, a plurality of yellow lights 114, and a red light 116. The green light 112 indicates that the detected thickness of the item (e.g. a single paper, a stack of papers, a compact disc, a credit card, etc.) that has been placed in the throat 36 of the shredder 10 is below a first predetermined thickness and well within the capacity of the shredder. The yellow lights 114 provide a progressive indication of the thickness of the item. The first yellow light 114, located next to the green light 112, would be triggered when the detected thickness is at or above the first predetermined thickness, but below a second predetermined thickness that triggers the red light 116. If there is more than one yellow light 114, each additional yellow light 114 may correspond to thicknesses at or above a corresponding number of predetermined thicknesses between the first and second predetermined thicknesses. The yellow lights 114 may be used to train the user into getting a feel for how many documents should be shredded at one time. The red light 116 indicates that the detected thickness is at or above the second predetermined thickness, which may be the same as the predetermined maximum thickness, thereby warning the user that this thickness has been reached.

The sequence of lights may be varied and their usage may vary. For example, they may be arranged linearly in a sequence as shown, or in other configurations (e.g. in a partial circle so that they appear like a fuel gauge or speedometer. Also, for example, the yellow light(s) 114 may be lit only for thickness(es) close to (i.e., within 25% of) the predetermined maximum thickness, which triggers the red light 116. This is a useful sequence because of most people's familiarity with traffic lights. Likewise, a plurality of green lights (or any other color) could be used to progressively indicate the detected thickness within a range. Each light would be activated upon the detected thickness being equal to or greater than a corresponding predetermined thickness. A red (or other color) light may be used at the end of the sequence of lights to emphasize that the predetermined maximum thickness has been reached or exceeded (or other ways of getting the user's attention may be used, such as emitting an audible signal, flashing all of the lights in the sequence, etc.). These alert features may be used in lieu of or in conjunction with cutting off power to the shredder mechanism upon detecting that the predetermined maximum thickness has been reached or exceeded.

Similarly, the aforementioned indicators of the progressive indicator system may be in the form of audible signals, rather than visual signals or lights. For example, like the yellow lights described above, audible signals may be used to provide a progressive indication of the thickness of the item. The audible signals may vary by number, frequency, pitch, and/or volume in such a way that provides the user with an indication of how close the detected thickness of the article is to the predetermined maximum thickness. For example, no signal or a single "beep" may be provided when the detected thickness is well below the predetermined maximum thickness, and a series of "beeps" that increase in number (e.g. more "beeps" the closer the detection is to the predetermined maximum thickness) and/or frequency (e.g. less time between beeps the closer the detection is to the predetermined maximum thickness) as the detected thickness approaches the predetermined maximum thickness may be provided. If the detected thickness is equal to or exceeds the predetermined maximum thickness, the series of "beeps" may be continuous, thereby indicating to the user that such a threshold has been met and that the thickness of the article to be shredded should be reduced.

The visual and audible signals may be used together in a single device. Also, other ways of indicating progressive thicknesses of the items inserted in the throat 36 may be used. For example, an LCD screen with a bar graph that increases as the detected thickness increases may be used. Also, a "fuel gauge," i.e., a dial with a pivoting needle moving progressively between zero and a maximum desired thickness, may also be used. As discussed above, with an audible signal, the number or frequency of the intermittent audible noises may increase along with the detected thickness. The invention is not limited to the indicators described herein, and other progressive (i.e., corresponding to multiple predetermined thickness levels) or binary (i.e., corresponding to a single predetermined thickness) indicators may be used.

The aforementioned predetermined thicknesses may be determined as follows. First, because the actual maximum thickness that the shredder mechanism may handle will depend on the material that makes up the item to be shredded, the maximum thickness may correspond to the thickness of the toughest article expected to be inserted into the shredder, such as a compact disc, which is made from polycarbonate. If it is known that the shredder mechanism may only be able to handle one compact disc at a time, the predetermined maximum thickness may be set to the standard thickness of a compact disc (i.e., 1.2 mm). It is estimated that such a thickness would also correspond to about 12 sheets of 20 lb. paper. Second, a margin for error may also be factored in. For example in the example given, the predetermined maximum thickness may be set to a higher thickness, such as to 1.5 mm, which would allow for approximately an additional 3 sheets of paper to be safely inserted into the shredder (but not an additional compact disc). Of course, these examples are not intended to be limiting in any way.

For shredders that include separate throats for receiving sheets of paper and compact discs and/or credit cards, a detector 100 may be provided to each of the throats and configured for different predetermined maximum thicknesses. For example, the same shredder mechanism may be able to handle one compact disc and 18 sheets of 20 lb. paper. Accordingly, the predetermined maximum thickness associated with the detector associated with the throat that is specifically designed to receive compact discs may be set to about 1.5 mm (0.3 mm above the standard thickness of a compact disc), while the predetermined maximum thickness associated with the detector associated with the throat that is specifically designed to receive sheets of paper may be set to about 1.8 mm. Of course, these examples are not intended to be limiting in any way and are only given to illustrate features of embodiments of the invention.

Similarly, a selector switch may optionally be provided on the shredder to allow the user to indicate what type of material is about to be shredded, and, hence the appropriate predetermined maximum thickness for the detector. A given shredder mechanism may be able to handle different maximum thicknesses for different types of materials, and the use of this selector switch allows the controller to use a different predetermined thickness for the material selected. For example, there may be a setting for "paper," "compact discs," and/or "credit cards," as these materials are known to have different cutting characteristics and are popular items to shred for security reasons. Again, based on the capacity of the shredder mechanism, the appropriate predetermined maximum thicknesses may be set based on the known thicknesses of the items to be shredded, whether it is the thickness of a single compact disc or credit card, or the thickness of a predetermined number of sheets of paper of a known weight, such as 20 lb. The selector switch is an optional feature, and the description thereof should not be considered to be limiting in any way.

Returning to FIG. 6, in addition to the indicator 110 discussed above, the detector 100 may also be in communication with the motor 18 that powers the shredder mechanism 16 via the controller 200. Specifically, the controller 200 may control whether power is provided to the motor 18 so that the shafts 20 may rotate the cutter elements 19 and shred the item. This way, if the thickness of the item to be shredded is detected to be greater than the capacity of the shredder mechanism 16, power will not be provided to the shredder mechanism 16, thereby making the shredder 10 temporarily inoperable. This not only protects the motor 18 from overload, it also provides an additional safety feature so that items that should not be placed in the shredder 10 are not able to pass through the shredder mechanism 16, even though they may fit in the throat 36 of the shredder 10.

Figure 8:
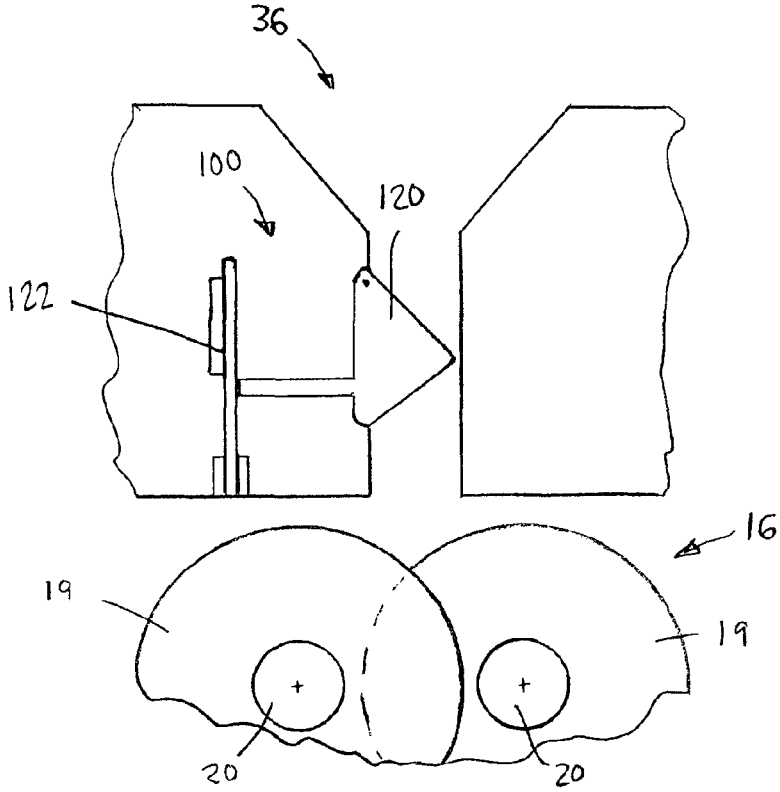
FIG. 8 is a schematic of an embodiment of a detector configured to detect a thickness of a article to be shredded by the shredder.

FIGS. 8-11 show different embodiments of the detector 100 that may be used to detect the thickness of an article (e.g. a compact disc, credit card, stack of papers, etc.) that is placed in the throat 36 of the shredder. As shown in FIG. 8, the detector 100 may include a contact member 120 that is mounted so that it extends into the throat 36 at one side thereof. The contact member 120 may be pivotally mounted or it may be mounted within a slot so that it translates relative to the throat 36. The contact member 120 is mounted so that as the item to be shredded is inserted into the throat 36, the item engages the contact member 120 and causes the contact member 120 to be pushed out of the way of the item. As shown in FIG. 8, a strain gauge 122 is located on a side of the contact member 120 that is opposite the throat 36. The strain gauge 122 is positioned so that it engages the contact member 120 and is able to measure the displacement of the contact member 120 relative to the throat 36. Other displacement sensors may be used. The greater the displacement, the thicker the item being inserted into the throat 36. The strain gauge 122 communicates this measurement to the controller 200 and the controller 200 determines whether the displacement measured by the strain gauge 122, and hence thickness of the item, is greater than the predetermined maximum thickness, thereby indicating that the item that is being fed into the throat of the shredder 10 will cause the shredder mechanism 16 to jam. If the detected thickness is greater than the predetermined maximum thickness, the controller 200 may send a signal to the indicator 110, as discussed above, and/or prevent power from powering the motor 18 to drive the shafts 20 and cutter elements 19. This way, a jam may be prevented. Likewise, the measured displacement of the contact member 120 may be used by the controller 200 to output progressive amounts of thicknesses, as discussed above. Of course, different configurations of the strain gauge 122 and contact member 120 may be used. The illustrated embodiment is not intended to be limiting in any way.

Figure 9:
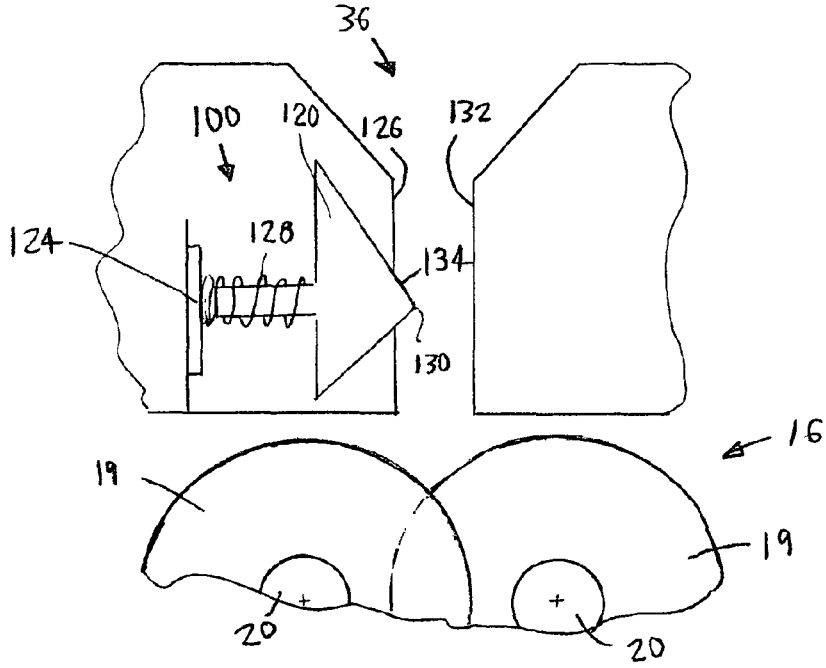
FIG. 9 is a schematic of another embodiment of a detector configured to detect a thickness of a article to be shredded by the shredder.

In another embodiment, illustrated in FIG. 9, the detector 100 includes the contact member 120 and a piezoelectric sensor 124. In this embodiment, the contact member 120 is mounted such that it protrudes through one wall 126 of the throat and into the throat by a small amount, thereby creating a slightly narrower throat opening. A spring 128 may be used to bias the contact member 120 into the throat 36. The narrower opening that is created by a tip 130 of the contact member 120 and a wall 132 opposite the spring 128 is less than the predetermined maximum thickness. Therefore, if an item that is too thick to be shredded enters the throat 36, it will engage a top side 134 of the contact member 120. Because the top side 134 of the contact member 120 is sloped, the contact member 120 will move against the bias of the spring 128 and into contact with the piezoelectric sensor 124, thereby causing a voltage to be created within the piezoelectric sensor 124. As the thickness of the item increases, the force applied by the contact member 120 to the piezoelectric sensor 124 increases, thereby increasing the voltage generated within the piezoelectric sensor 124. The resulting voltage may be communicated to the controller 200 or directly to the indicator 110, thereby causing the indicator 110 to indicate that the item is above the predetermined maximum thickness. In addition, the controller, upon sensing the voltage, may prevent power from powering the motor 18 to drive the shafts 20 and cutter elements 19. Of course, different configurations of the piezoelectric sensor 124 and contact member 120 may be used. The illustrated embodiment is not intended to be limiting in any way.

Figure 10:
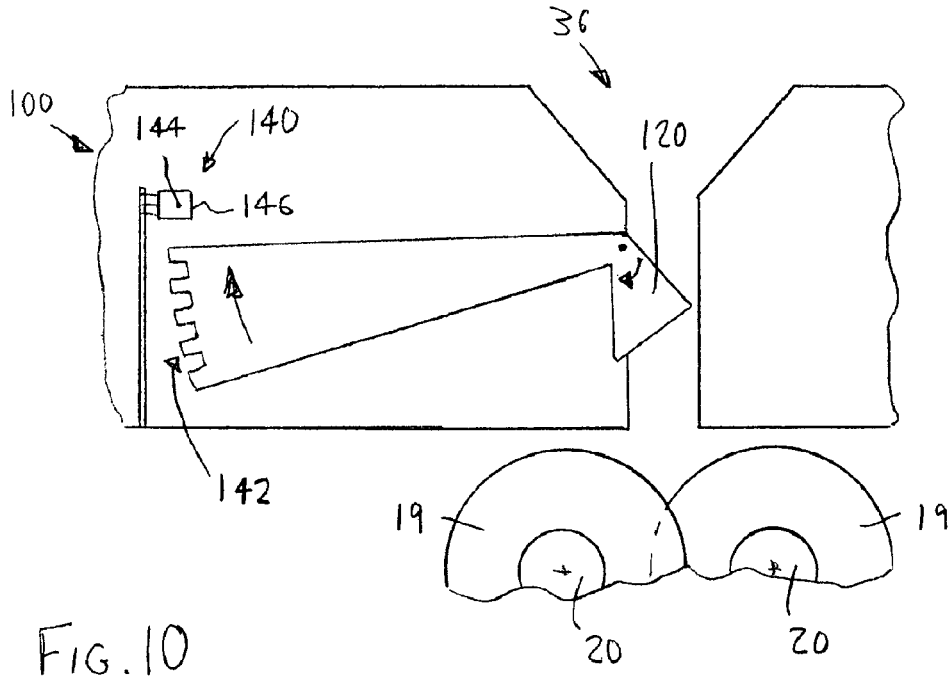
FIG. 10 is a schematic of another embodiment of a detector configured to detect a thickness of a article to be shredded by the shredder.

In another embodiment, illustrated in FIG. 10, the detector 100 includes the contact member 120 and an optical sensor 140. In this embodiment, the contact member 120 is pivotally mounted such that one portion extends into the throat 36 and another portion, which has a plurality of rotation indicators 142, extends away from the throat 36. The optical sensor 140 may be configured to sense the rotation indicators 142 as the rotation indicators 142 rotate past the optical sensor 140. For example, the optical sensor 140 may include an infrared LED 144 and a dual die infrared receiver 146 to detect the direction and amount of motion of the contact member 120. As shown in FIG. 7, the contact member 120 may be configured such that a small amount of rotation of the contact member is amplified at the opposite end of the contact member 120, thereby improving the sensor's ability to sense changes in the thickness of the items that cause the contact member 120 to rotate. Of course, different configurations of the optical sensor 140 and contact member 120 may be used. The illustrated embodiment is not intended to be limiting in any way.

Figure 11:
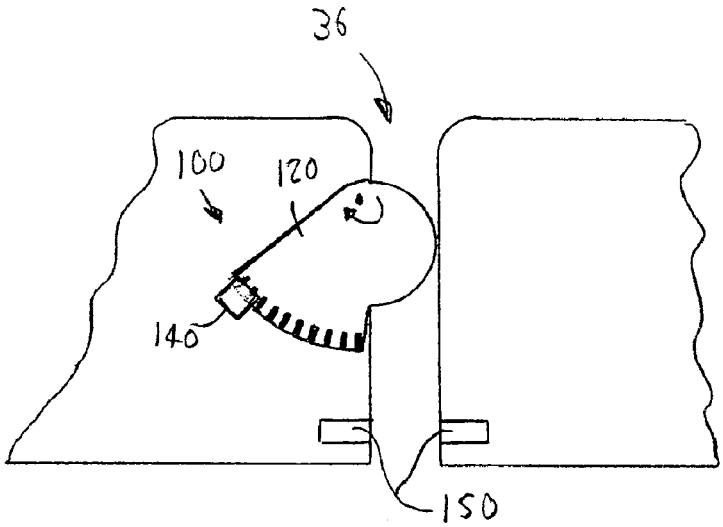
FIG. 11 is a schematic of another embodiment of the detector of FIG. 10.

Another embodiment of the detector 100 that includes the optical sensor 140 is shown in FIG. 11. As illustrated in FIG. 8, the detector 100 is located above an infrared sensor 150 that detects the presence of an article. Of course, any such sensor may be used. The illustrated embodiment is not intended to be limiting in any way. The sensor 150 provides a signal to the controller 200, which in turn is communicated to the motor 18. When the sensor 150 senses that an article is passing through a lower portion of the throat 36, the controller 200 signals the motor 18 to start turning the shafts 20 and cutter elements 19. Of course, because the detector 100 is also in communication with the controller 200, if the detector 100 detects that the thickness of the article that has entered the throat is too thick for the capacity of the shredder mechanism 16, the shredder mechanism 16 may not operate, even though the sensor 150 has indicated that it is time for the shredder mechanism 16 to operate. Of course, this particular configuration is not intended to be limiting in any way.

Although various illustrated embodiments herein employ particular sensors, it is to be noted that other approaches may be employed to detect the thickness of the stack of documents or article being fed into the throat 36 of the shredder 10. For example, embodiments utilizing eddy current, inductive, photoelectric, ultrasonic, Hall effect, or even infrared proximity sensor technologies are also contemplated and are considered to be within the scope of the present invention.

The sensors discussed above, and other possible sensors, may also be used to initiate the shredding operation by enabling the power to be delivered to the motor of the shredder mechanism. This use of sensors in the shredder throat is known, and they allow the shredder to remain idle until an item is inserted therein and contacts the sensor, which in turn enables power to operate the motor to rotate the cutting elements via the shafts. The controller 200 may be configured such that the insertion of an item will perform this function of enabling power delivery to operate the shredder mechanism motor. The motor may be cut-off or not even started if the thickness exceeds the predetermined maximum thickness.

Returning to FIG. 6, for embodiments of the shredder 10 that include the lubrication system 80, the controller 200 may be programmed to communicate with the controller 96 associated with the lubrication system 80 to operate the pump 82 in a number of different modes. The controller 200 and the controller 96 may be part of the same controller, or may be separate controllers that communicate with each another. In one embodiment, the controller 96 is programmed to operate according to a predetermined timing schedule. In another, the controller 96 activates the pump upon a certain number of rotations of the drive for the cutter elements. In another embodiment, the detector 100 at the throat 36 of the shredder 10 monitors the thickness of items deposited therein. Upon accumulation of a predetermined total thickness of material shredded, the controller 96 activates the pump to lubricate the cutter elements 19. For example, if the predetermined total thickness of material is programmed in the controller 96 to be 0.1 m (100 mm), then once the total accumulated detected thickness of articles that have been shredder is at least equal to 0.1 m (e.g., one hundred articles with an average thickness of 1 mm, or fifty articles with an average thickness of 2 mm, etc.), the controller 96 will activate the pump 82 of the lubrication system 80 to lubricate the cutter elements 19.

It is also possible to schedule the lubrication based on a number of uses of the shredder (e.g., the controller tracks or counts the number of shredding operations and activates the pump after a predetermined number of shredder operations). In each of the embodiments making use of accumulated measures, a memory 97 can be incorporated for the purpose of tracking use. Although the memory 97 is illustrated as being part of the controller 96 associated with the lubrication system, the memory may be part of the shredder controller 200, or may be located on some other part of the shredder 10. The illustrated embodiment is not intended to be limiting in any way.

In addition, the accumulated measures (e.g. the number of shredding operations or the accumulated thickness of the articles that have been shredded) may be used to alert the user that maintenance should be completed on the shredder. The alert may come in the form of a visual or audible signal, such as the signals discussed above, or the controller may prevent power from powering the shedder mechanism until the maintenance has been completed.

The ability to keep track of the accumulated use of the shredder may also be helpful in a warranty context, where the warranty could be based on the actual use of the shredder, rather than time. This is similar to the warranties that are used with automobiles, such as "100,000 miles or 10 years, whichever comes first." For example, the warranty may be based on 100 uses or one year, whichever comes first, or the warranty may be based on shredding paper having a total sensed thickness of 1 meter or 2 years, whichever comes first, and so on.

Figure 12:
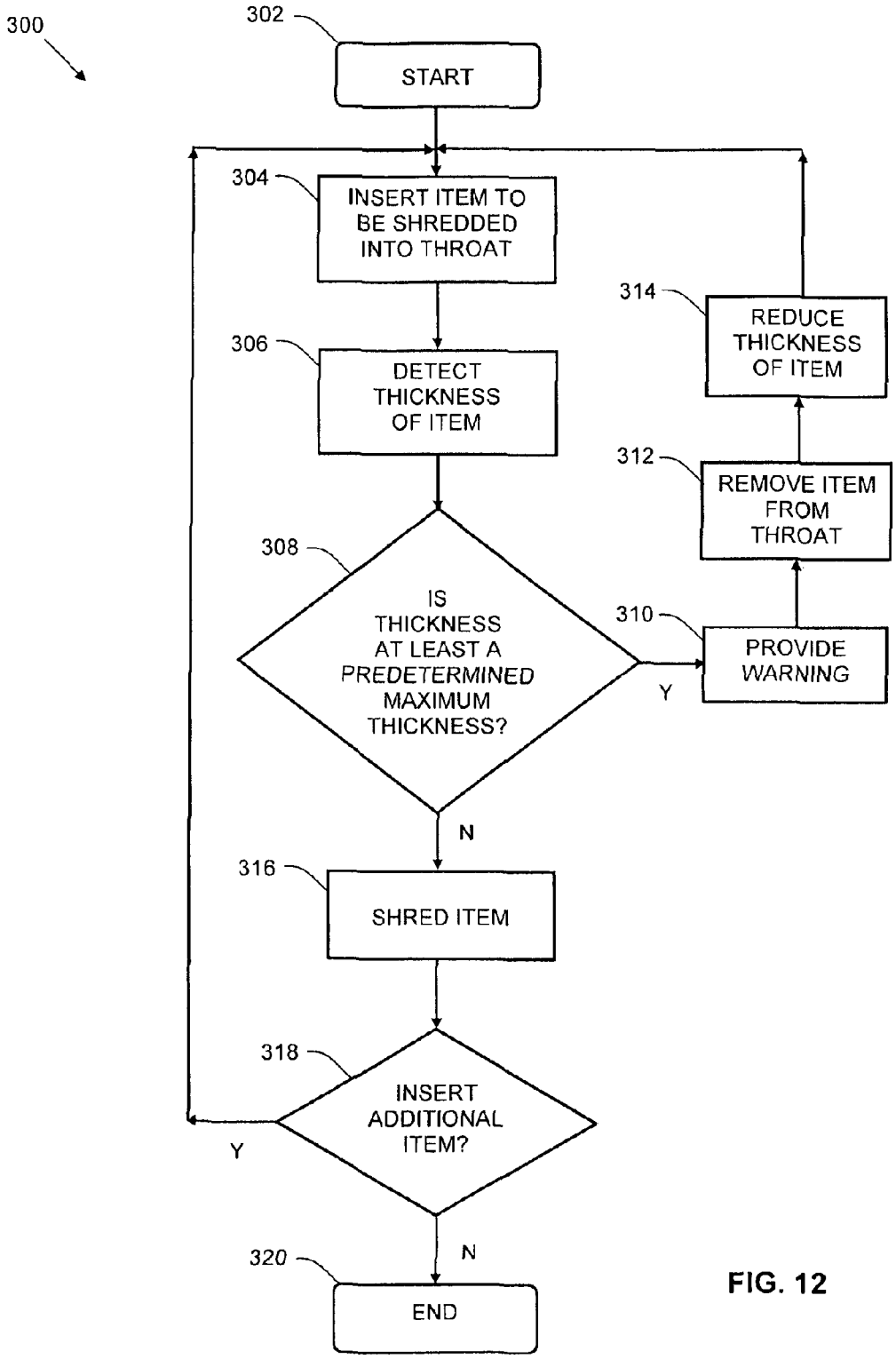
FIG. 12 is a flow diagram of an embodiment of a method for shredding an article.

FIG. 12 illustrates a method 300 for detecting the thickness of an item, e.g. a stack of documents or an article, being fed into the throat 36 of the shredder 10. The method starts at 302. At 304, the item is fed into the throat 36 of the shredder 10. At 306, the detector 100 detects the thickness of the item. At 308, the controller 200 determines whether the thickness that has been detected is greater than a predetermined maximum thickness. The predetermined maximum thickness may be based on the capacity of the shredder mechanism 16, as discussed above. If the controller 200 determines that the thickness that has been detected is at least the predetermined maximum thickness, at 310, a warning is provided. For example, to provide the warning, the controller 200 may cause the red light 116 to illuminate and/or causes an audible signal to sound and/or cause power to be disrupted to the motor 18 so that the shredder mechanism 16 will not shred the item. The user should then remove the item from the throat 36 of the shredder 10 at 312, and reduce the thickness of the item at 314 before inserting the item back into the throat 36 at 304.

If the controller 200 determines that the thickness that has been detected is less than the predetermined maximum thickness, the controller 200 may cause the green light 112 to illuminate and/or allows power to be supplied to the shredder mechanism 16 so that the shredder 10 may proceed with shredding the item at 316.

In the embodiment that includes the plurality of yellow lights 114 as part of the indicator 100, if the controller 200 determines that the thickness that has been detected is less than the predetermined maximum thickness, but close to or about the predetermined maximum thickness, the controller 200 may cause one of the yellow lights to illuminate, depending on how close to the predetermined maximum thickness the detected thickness is. For example, the different yellow lights may represent increments of about 0.1 mm so that if the detected thickness is within 0.1 mm of the predetermined maximum thickness, the yellow light 114 that is closest to the red light 116 illuminates, and so on. Although power will still be supplied to the shredder mechanism 16, the user will be warned that that particular thickness is very close to the capacity limit of the shredder 10. Of course, any increment of thickness may be used to cause a particular yellow light to illuminate. The example given should not be considered to be limiting in any way.

Returning to the method 300 of FIG. 9, at 318, the user may insert an additional item, such as another document or stack of documents, as the shredder mechanism 16 is shredding the previous item that was fed into the throat 36 of the shredder at 304. If the user does insert an additional item into the throat 36 at 318, the method returns to 304, and the detector 100 detects the thickness of the item at the location of the detector 100 at 306, and so on. If part of the previous item is still in the throat 36, the cumulative thickness of the item being shredder and the new item may be detected. If the user does not add an additional item at 318, the method ends at 320. The illustrated method is not intended to be limiting in any way.

The foregoing illustrated embodiments have been provided to illustrate the structural and functional principles of the present invention and are not intended to be limiting. To the contrary, the present invention is intended to encompass all modifications, alterations and substitutions within the spirit and scope of the appended claims.

What is claimed is:

[1. A shredder comprising:

a housing having a throat open to an exterior of the housing for permitting a user to feed at least one article to be shredded;

a shredder mechanism received in the housing and including an electrically powered motor and cutter elements, the shredder mechanism enabling the at least one article fed into the throat to be shredded to be fed into the cutter elements and the motor being operable to drive the cutter elements in a shredding direction so that the cutter elements shred the articles fed therein;

a thickness detector configured to detect a thickness between opposing major surfaces of the at least one article to be shredded being received by the throat;

a maximum thickness indicator having a visual or audible output and configured to indicate a visual or audible signal to a user of the shredder via the visual or audible output;

a controller configured to actuate the maximum thickness indicator and indicate the visual or audible signal to the user via the visual or audible output responsive to the detector detecting that the thickness of the at least one article is at least equal to a predetermined maximum thickness.]

[2. A shredder according to claim 1, wherein the maximum thickness indicator includes a light that is illuminated to indicate the signal to the user.]

[3. A shredder according to claim 1, wherein the maximum indicator includes an audible alarm that audibly indicates the signal to the user.]

[4. A shredder according to claim 1, wherein the controller is also configured to prevent the motor from driving the cutter elements in the shredding direction responsive to the detector detecting that the thickness of the at least one article is at least equal to the predetermined maximum thickness.]

[5. A shredder according to claim 1, wherein the maximum thickness indicator is included in a progressive indicator system coupled to the controller, wherein the progressive indicator system is configured to indicate a detected thickness of the at least one article within a range of thicknesses up to and including the predetermined maximum thickness.]

[6. A shredder according to claim 5, wherein the progressive indicator system has a plurality of indicators, wherein each indicator is associated with a corresponding predetermined thickness of the at least one article within said range, the plurality of indicators including the maximum thickness indicator corresponding to the predetermined maximum thickness, wherein the progressive indicator system activates the indicator associated with its respective corresponding predetermined thickness based on the detector detecting that the thickness of the at least one article is at least equal to the corresponding predetermined thickness.]

[7. A shredder according to claim 6, wherein the progressive indicator system comprises a plurality of lights.]

[8. A shredder according to claim 1, wherein the detector comprises a contact member that extends into the throat and is actuated in response to the article being inserted into the throat.]

[9. A shredder according to claim 8, wherein the detector further comprises a strain gauge configured to measure movement of the contact member and communicate the movement to the controller.]

[10. A shredder according to claim 8, wherein the detector further comprises a piezoelectric sensor configured to measure movement of the contact member and communicate the movement to the controller.]

[11. A shredder according to claim 8, wherein the detector further comprises an optical sensor configured to measure movement of the contact member and communicate the movement to the controller.]

[12. A shredder according to claim 11, wherein the optical sensor comprises an infrared LED and a dual die infrared receiver configured to detect the direction and amount of the movement.]

[13. A shredder according to claim 1, wherein the detector is also configured to detect a presence of the at least one article to be shredded being received by the throat, and wherein the controller is configured to operate the motor to drive the cutter elements in the shredding direction responsive to the detector detecting both the presence of the at least one article to be shredded being received by the throat and that the thickness thereof is less than the predetermined maximum thickness.]

[14. A shredder according to claim 1, wherein the detector is a thickness detector and the shredder further comprises a presence detector configured to detect a presence of the at least one article to be shredded being received by the throat, wherein the controller is configured to operate the motor to drive the cutter elements in the shredding direction responsive to the presence detector detecting the presence of the at least one article to be shredded being received by the throat.]

[15. A shredder according to claim 14, wherein the controller is configured to operate the motor to drive the cutter elements in the shredding direction responsive to both the presence detector detecting the presence of the at least one article to be shredded being received by the throat and the thickness sensor detecting that the thickness thereof is less than the predetermined maximum thickness.]

*16. A shredder comprising:*

*a housing having a throat open to an exterior of the housing for permitting a user to feed at least one article to be shredded;*

*a shredder mechanism received in the housing and including an electrically powered motor and cutter elements, the shredder mechanism enabling the at least one article fed into the throat to be shredded to be fed into the cutter elements and the motor being operable to drive the cutter elements in a shredding direction so that the cutter elements shred the articles fed therein;*

*a thickness detector configured to detect a thickness between opposing major surfaces of the at least one article to be shredded being received by the throat;*

*a maximum thickness indicator having a visual or audible output and configured to indicate a visual or audible signal to a user of the shredder via the visual or audible output;*

*a controller configured to actuate the maximum thickness indicator and indicate the visual or audible signal to the user via the visual or audible output responsive to the detector detecting that the thickness of the at least one article is at least equal to a predetermined maximum thickness;*

*wherein the detector is a thickness detector and the shredder further comprises a presence detector configured to detect a presence of the at least one article to be shredded being received by the throat, wherein the controller is configured to operate the motor to drive the cutter elements in the shredding direction responsive to the presence detector detecting the presence of the at least one article to be shredded being received by the throat;*

*wherein the controller starts the motor to drive the cutter elements in the shredding direction only in response to both the presence detector detecting the presence of the at least one article to be shredded being received by the throat and the thickness detector detecting that the thickness thereof is less than the predetermined maximum thickness.*

*17. A shredder according to claim 16, wherein the detector comprises a contact member that extends into the throat and is actuated in response to the article being inserted into the throat.*

*18. A shredder according to claim 17, wherein said thickness detector is a variable thickness detector for outputting a variable amount of movement of said contact member.*

*19. A shredder according to claim 18, wherein said thickness detector includes an optical sensor and indicators movable past the optical sensor by movement of said contact member to enable the variable amount of movement of said contact member to be output by the optical sensor.*

*20. A shredder according to claim 18, wherein the detector further comprises a strain gauge configured to measure movement of the contact member and communicate the movement to the controller.*

*21. A shredder according to claim 18, wherein the detector further comprises a piezoelectric sensor configured to measure movement of the contact member and communicate the movement to the controller.*

*22. A shredder according to claim 16, wherein said thickness detector includes a sensor and the contact member is coupled to a detectable element movable for detection by the sensor, and wherein said thickness detector is configured such that movement of said contact member in the throat amplifies movement of the detectable element at the sensor.*

* * * * *